United States Patent [19]

Robin

[11] Patent Number: 5,429,649
[45] Date of Patent: Jul. 4, 1995

[54] DEVICE FOR THE DETECTION OF THE CLOGGING OF AN AIR FILTER

[76] Inventor: Roger C. Robin, 7 Clos du Gandouget Les Elancourtines, 78990 Elancourt, France

[21] Appl. No.: 47,099

[22] Filed: Apr. 13, 1993

[30] Foreign Application Priority Data

Apr. 14, 1992 [FR] France ............... 92 04684
Feb. 9, 1993 [FR] France ............... 93 01413

[51] Int. Cl.⁶ .................................. B01D 35/143
[52] U.S. Cl. .......................... 55/215; 55/274; 55/309; 55/385.3
[58] Field of Search .......... 55/274, 309, 215, 385.3; 95/1, 14, 20

[56] References Cited

U.S. PATENT DOCUMENTS

| 3,790,931 | 2/1974 | Leveraus | 340/151 |
| 4,006,511 | 2/1977 | Larsen | 55/309 X |
| 4,050,291 | 9/1977 | Nelson | 55/274 X |
| 4,356,007 | 10/1982 | Bowman | 55/309 X |
| 5,141,309 | 8/1982 | Worwag | 55/274 X |

FOREIGN PATENT DOCUMENTS

| 141958 | 7/1951 | Australia | 55/309 |
| 3642992 | 6/1988 | Germany . | |
| 494500 | 10/1938 | United Kingdom | 55/309 |

Primary Examiner—Richard L. Chiesa
Attorney, Agent, or Firm—Steinberg, Raskin & Davidson

[57] ABSTRACT

A device for the detection of an air filter having an auxiliary air duct opening upstream and downstream of the air filter so as to generate in the auxiliary duct an air flow due to the head loss of the air filter and having a velocity varying in accordance with the head loss; and an electronic circuit delivering from the signals of first and second sensing devices, a signal representative of a limit clogging of the air filter when the air flow speeds within a main duct and the auxiliary duct are differing by a determined value corresponding to a limit head loss of the air filter, the device being applicable to air conditioning equipments fitting automotive vehicles.

20 Claims, 4 Drawing Sheets

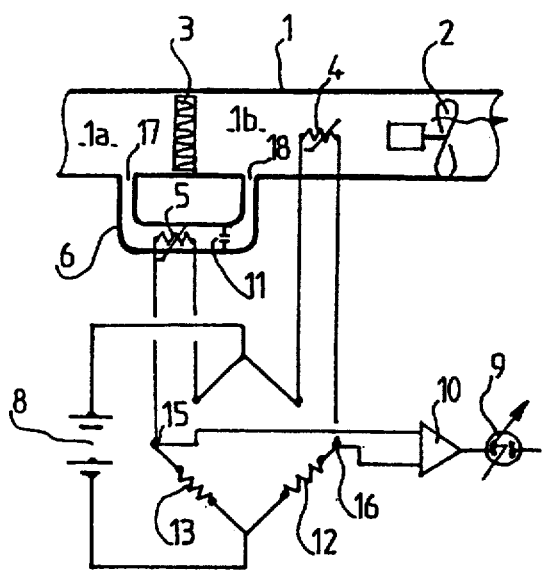
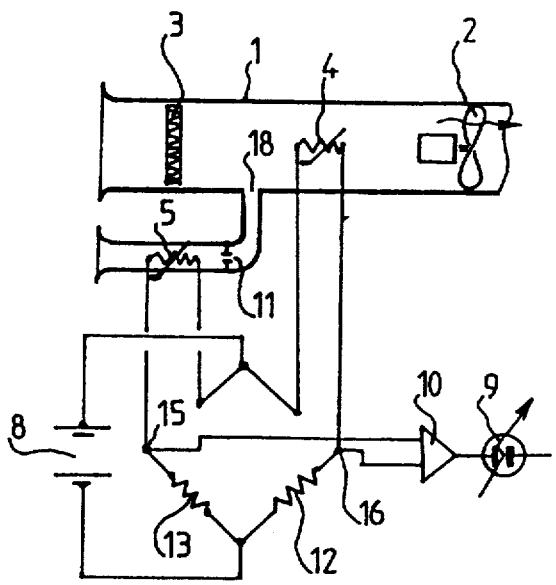
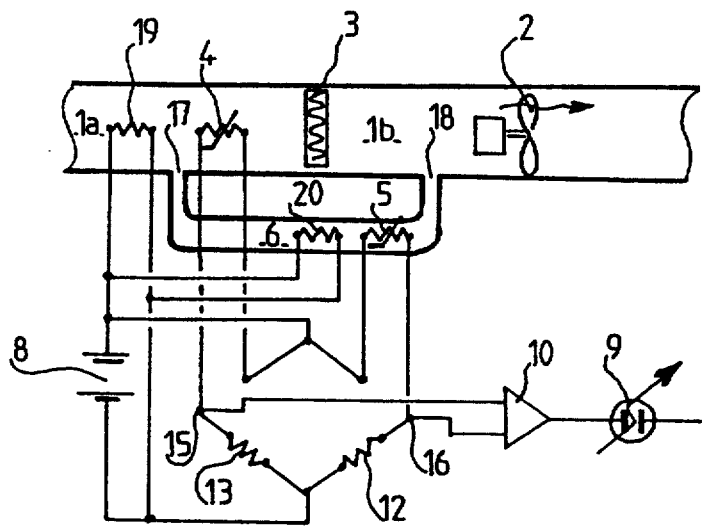

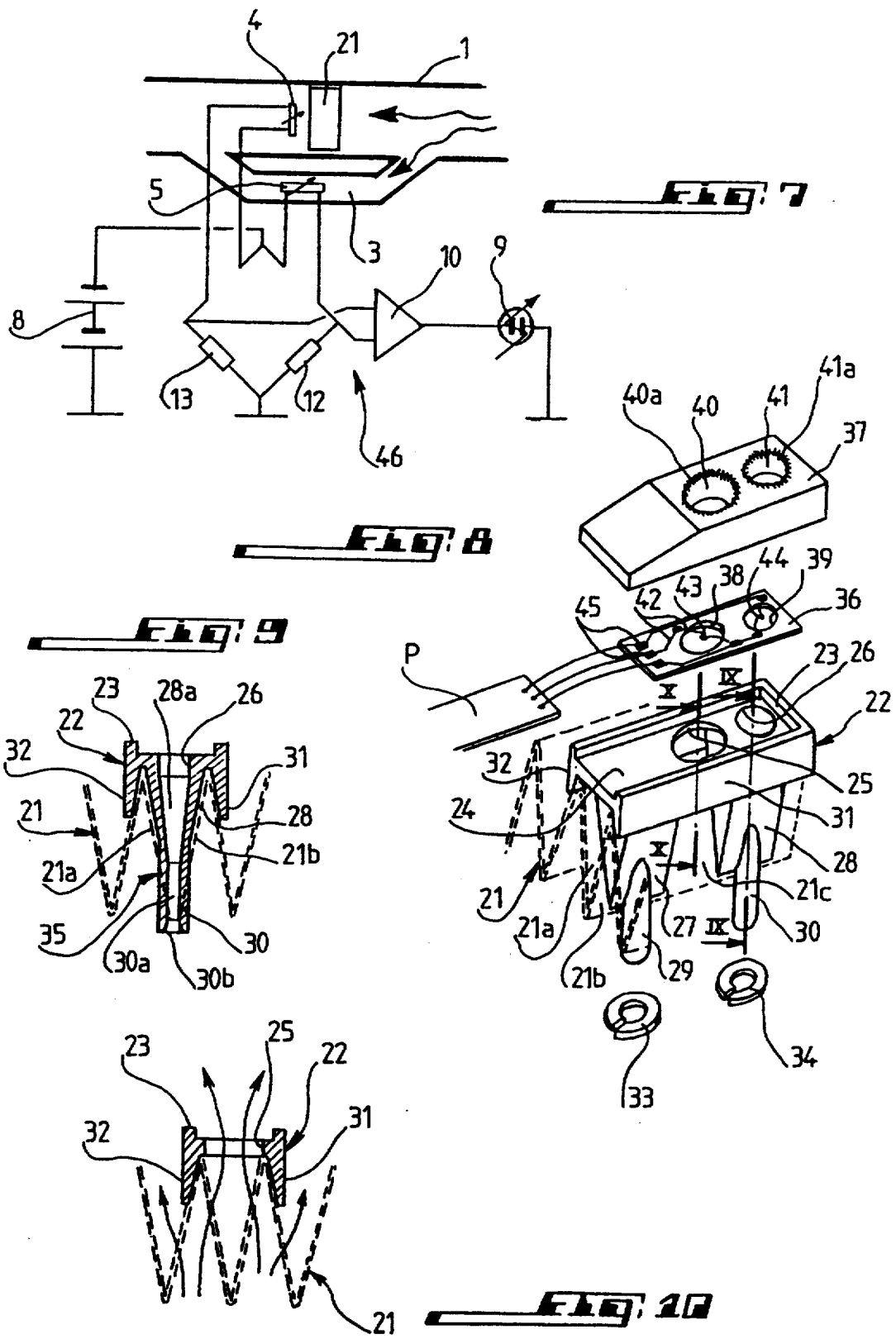

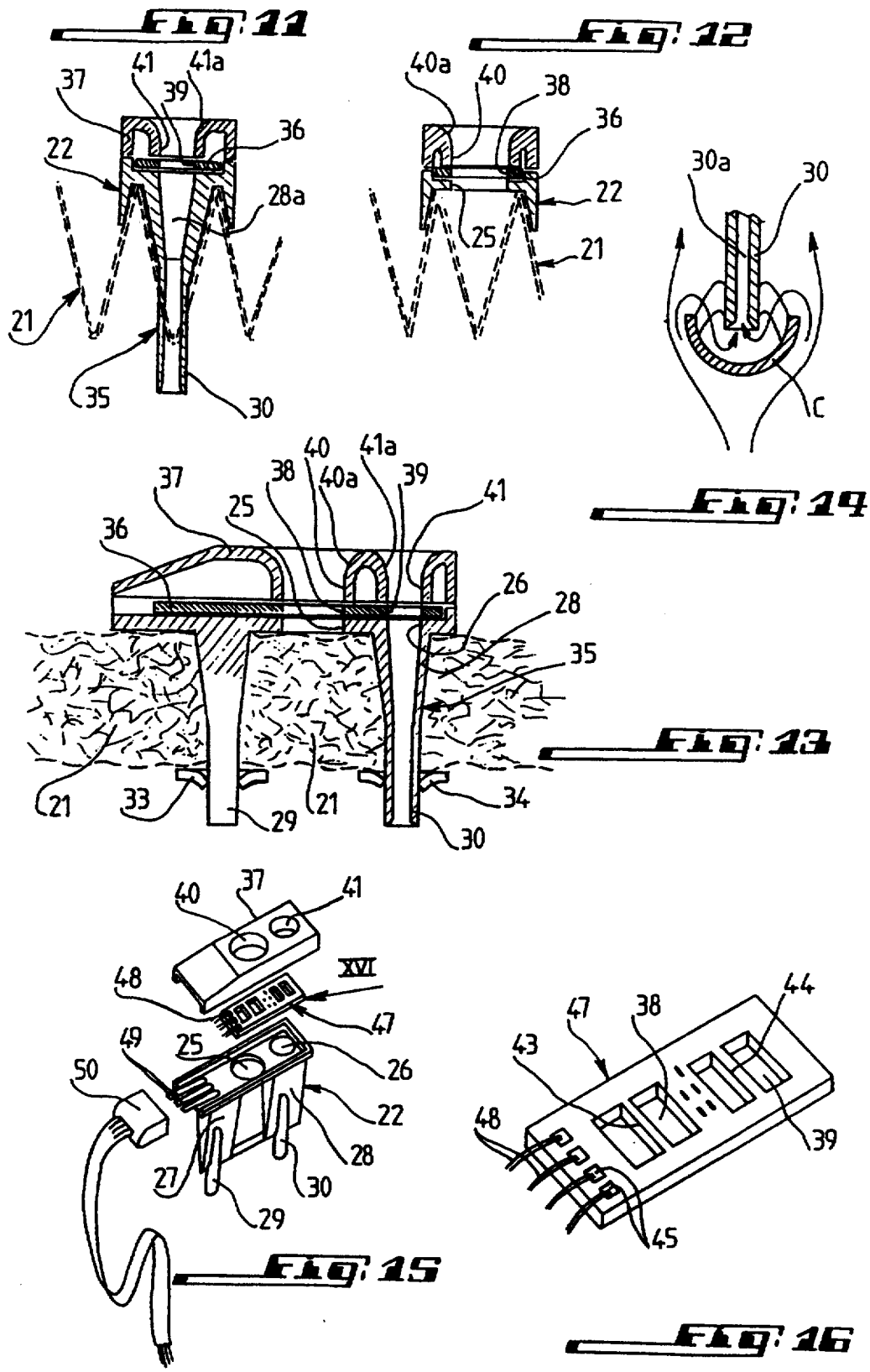

DEVICE FOR THE DETECTION OF THE CLOGGING OF AN AIR FILTER

BACKGROUND OF THE INVENTION

The present invention relates to a device for the detection of the clogging of an air filter.

The air treatment equipments and more particularly the heating and air conditioning devices of automotive vehicles are often fitted with filters adapted to retain the particles in suspension in the processed air. These filters are creating pressure losses when the air is flowing through, the magnitude of these losses being a function of the speed of the air which is flowing therethrough. During their use these filters would be loaded with dust and particles which should be retained by the filters which become gradually clogged.

This clogging of the filters induces an increase in their head loss which is harmful to the good operation of the equipments.

There are known equipments adapted to advise the user of the state of clogging of such filters. These equipments are very often based upon the measurement of the head loss exerted by the filter upon the air flow. This head loss is often compared to a predetermined value in a comparator circuit which when the head loss exceeds the predetermined value would release an alarm inviting the user to carry out a cleaning of the filtering surfaces or to provide for the replacement or causes a suitable device to become operative for overhauling the filtering surfaces, which device is often referred to as an "unclogging" device.

Such devices are effective on equipments adapted to operate with a constant air flow rate. They may however not be properly used on equipments fitted with flow rate adjusting means such as fan rotational speed variators or air flow rate shut-off flaps like those which are fitting the air conditioning equipments for automotive vehicles.

The head loss of air filters is indeed a function of two parameters at the same time: the velocity of the air which is flowing therethrough and their state of clogging.

The measurement alone of the head loss induced by the filter does not allow to distinguish the part due to each one of the two causes and more particularly it does not allow to make out at a small air flow rate whether an excessive clogging of the filter has not been reached although the ascertained head loss remains lower than a fixed limit.

In this case the prior equipments provided for the detection of the clogging of filters adapted to operate with a variable air flow rate by the processing of two data, the one originating from the measurement of the speed of the air flowing through the filter and the other one from the measurement of the head loss produced by the latter.

The method exhibits the serious inconvenience of requiring the processing of measurements performed in absolute values thereby involving precision measurements.

Such measurements require appliances which are tricky to be put in operation, expensive and not very well adapted to the requirements of the automotive vehicle market.

OBJECTS AND SUMMARY OF THE INVENTION

The object of the present invention is to provide a device for the detection of the clogging of an air filter permitting to remove the inconveniences of the known devices referred to hereinabove while exhibiting a great insensitivity to the spurious phenomena of variation in the electric supply voltage and in temperature and of a very reduced cost with respect to prior art equipments.

For that purpose according to the invention the device for the detection of the clogging of an air filter located in a main duct of an air conditioning plant operating with a constant or variable air flow rate is characterized in that it comprises an auxiliary air duct opening upstream and downstream of the filter so as to generate in the auxiliary duct an air flow due to the head loss of the air filter and with a speed varying according to the head loss; a first sensing means arranged within the main duct of the air filter for delivering a signal relating to the flow velocity of the air flowing through the air filter; a second sensing means supplying a signal relating to the flow velocity of the air within the auxiliary duct; and an electronic circuit delivering from signals from the first and second sensing means a signal representative of a limit clogging of the air filter when the air flow speeds in the main duct and in the auxiliary duct are differing by a predetermined value corresponding to a limit head loss of the air filters.

The auxiliary air duct has one end connected to the main duct while opening downstream of the air filter and the second sensing means is arranged within the auxiliary duct.

The first and second sensing means consist of two electrically conducting elements steeping in the air flows streaming through the air filter and the auxiliary duct and with resistances varying with the temperature bound to the velocities of these air flows.

The aforesaid electronic circuit is arranged to compare the values of the variable resistances of two electrically conducting elements the resistances of which has a positive or a negative temperature coefficient and to deliver the signal representative of the limit clogging of the air filter when the ratio of the values of the resistances of these two elements corresponds to the limit head loss of the air filter.

The electronic circuit comprises a measuring bridge connection with resistors two adjacent legs of which comprise both conducting elements with variable resistances, respectively, delivering a determined imbalance voltage of the bridge when the ratio of the values of the resistances of the conducting elements corresponds to the limit head loss of the air filter; and an amplifier connected at the output of the measuring bridge connection with resistors to amplify the output voltage of the measuring bridge connection and thus provide the signal representative of the limit clogging of the air filter.

The auxiliary duct is branched in by-passing relationship off the main duct of the air filter while also opening upstream of the air filter.

According to an alternative embodiment the auxiliary duct has its end, which is opposite to that opening into the duct of the air filter, communicating with the atmosphere.

The auxiliary duct is of such a size that the air flow speed in the latter in the vicinity of the second sensing means is substantially equal when the air filter is clean to the air velocity flowing through the air filter.

The device comprises a calibrated aperture, if need be with an adjustable cross-section, positioned within the auxiliary duct for making substantially equal the air flow velocities within the main and auxiliary ducts.

Each electrically conducting element with a variable resistance is directly heated by the current flowing therethrough or is heated by an auxiliary electric resistor located near the latter.

The aforesaid amplifier is connected to a clogging indicator means or to a device for the automatic unclogging of the air filter.

The measuring bridge of the device described hereinabove provides a signal usable for the determination of the unclogging or of the clogging of the air filter on condition that one of the elements sensitive to the temperature be subjected to the air flux flowing through the air filter and that the other element sensitive to the temperature be placed in the by-pass duct the resistance of which to the flow should be independent of the clogging of the air filter.

This requirement is however not at all met by the detection device described hereinabove.

As a matter of fact at first in order that the determination of the clogging of the filter be not altered in the wrong way it is necessary that both duct branches consisting of the main duct and of the by-pass duct evolve in the same manner in accordance with the circulation speeds of the fluid (air). Now it is known that any duct within which is flowing a fluid exhibits head losses resulting from the addition of two distinct phenomena comprising a) the viscous friction of the fluid along the walls of the duct resulting in head losses directly proportional to the flow velocity of the fluid and b) the dissipation of kinetic energy originating from changes in the direction of flow of the fluid and/or from variations of the flow speed of the latter and proportional to the square of the flow speed. As to the porous or fibrous materials constituting the air filter, the losses through friction are highly preponderant so that the head losses of this filter are evolving in a practically linear manner as a function of the flow velocity and do therefore not disturb the measurement of the flow speed of the fluid flowing through this filter by the temperature-sensitive element. On the contrary with little viscous fluids such as air flowing through somewhat tortuous ducts with common geometry, the head losses through dissipation of kinetic energy are the most influential ones and this is just the case with respect to the by-pass duct of the device used hereinabove, thus producing such head losses which are altering in a wrong way the determination of the clogging of the air filter.

In the second place the operation of the measuring bridge with variable resistors of the device referred to hereinabove assumes that the temperature equilibrium conditions of each one of the two sensitive elements of this bridge be reached under the double effect of a thermal power supplied to each element and of the cooling of the latter and of the effect of the flow velocity of the fluid (air) in which it is steeping. A proper operation of this measuring bridge involves an identity of fluid temperatures when approaching both sensitive elements of this bridge. Now this is not the case since the temperature of the air flowing within the by-pass duct outside of the main duct substantially differs from that of the fluid circulating within the main duct and in order that such temperatures be substantially equal, it should then be necessary to provide air stirring means providing the homogeneousness of the temperatures and a perfect insulation of the walls of these ducts with respect to the external medium.

The present invention is also aiming at removing the inconveniences described hereinabove of the detection device previously described by providing a device for the detection of the clogging of an air filter, characterized in that the auxiliary duct is accommodated axially within the main duct and extends through the air filter while opening upstream and downstream thereof and the second sensing means is arranged within the air flow streaming through the auxiliary duct while being located close to the first sensing means.

The auxiliary duct is advantageously a tube or pipe shaped as a Venturi nozzle.

According to another characterizing feature of the invention the device comprises an auxiliary duct supporting body made fast to the air filter and defining within the latter an insulated portion of the air filter adjacent to the auxiliary duct and the first sensing means is located in the air flow flowing through the insulated portion of the air filter.

Advantageously the first and second sensing means are mounted in a box-shaped front portion of the supporting body, located outside of the air filter and bearing upon the downstream face of the air filter and are located substantially in a same plane near the wall forming the bottom of the front portion in front of two apertures, respectively, formed in the bottom wall and allowing the passage of the air flowing through the auxiliary duct and of the air flowing through the insulated portion of the air filter, respectively.

The first and second sensing means are mounted onto a support plate while being arranged within two apertures within the support plate, respectively, removably housed within the front portion of the supporting body and enclosed therein by a cover fastened to the supporting body, the cover also comprising two openings with the same diameters and spacing than those of the openings of the support plate and of the bottom plate so as to allow the passage of air through the auxiliary duct and the insulated portion of the air filter.

The support plate forms a printed circuit upon which are set the first and second sensing means as well as the electronic circuit for the processing of the signals originating from these sensing means.

According to an alternative embodiment the support plate, the first and second sensing means and the electronic circuit for processing the signals from these sensing means constitute an integrated monolithic silicon component.

Advantageously the supporting body comprises two identical parallel rear elements connected to the bottom plate of the front portion and extending through the air filter while being separated from each other so as to define the aforesaid insulated portion of the air filter.

The auxiliary duct is defined within one of the rear elements and by a stud extending this rear element while projecting from the air filter.

The other rear element is also extended by a stud projecting from the air filter and the front portion of the supporting body is held in bearing relationship upon the corresponding face of the air filter by two holding members fastened onto both studs, respectively, while bearing upon the opposite face of the air filter and consisting each one for example of a split elastic washer.

In the case where the air filter is of the type with folds, both rear elements of the supporting body are conforming to the hollow of one fold of the filter and both studs are extending through the connecting edge of this fold.

The first and second sensing means consist preferably of two electrically conducting elements, respectively, steeping in the air flow flowing through the air filter and the auxiliary duct and with resistances varying with the temperature bound to the velocities of these air flows.

The aforesaid electronic processing circuit is arranged to compare the values of variable resistances of both electrically conducting elements the resistances of which have a positive or a negative temperature coefficient and to deliver the signal representative of the limit clogging of the air filter when the ratio of the values of resistances of these two elements corresponds to the limit head loss of the air filter.

Advantageously the electronic circuit comprises a measuring bridge connection with resistors both adjacent legs of which comprise both conducting elements with variable resistances, respectively, and delivering a determined imbalance voltage of the bridge when the ratio of the values of resistances of the elements corresponds to the limit head loss of the air filter; and an amplifier connected at the output of the measuring bridge connection with resistors to amplify the output voltage of the measuring bridge connection with resistors and to thus provide the signal representative of the limit clogging of the air filter.

Advantageously the front portion, the rear elements and the studs of the supporting body are made in one single piece.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting examples only illustrating several embodiments of the invention and in which:

FIGS. 4 to 6 show alternative embodiments of the device according to the invention;

FIG. 7 shows a device for the detection of the clogging of an air filter similar to that of FIG. 1;

FIG. 8 shows an exploded view of the device for the detection of the clogging of an air filter according to the invention;

FIG. 9 is a view in section taken upon the line IX—IX of FIG. 8;

FIG. 10 is a view in section taken upon the line X—X of FIG. 8;

FIG. 11 is a view in section similar to that of FIG. 9 of the detection device in the assembled position;

FIG. 12 is a view in section similar to that of FIG. 10 of the detection device in the assembled position;

FIG. 13 shows in section the detection device of the invention mounted within an air filter of the flat type;

FIG. 14 is a partial sectional view showing a cap provided at one end of the Venturi tube used in the device according to the invention;

FIG. 15 is an exploded view similar to that of FIG. 8 and showing an alternative embodiment of the device according to the invention; and FIG. 16 is an enlarged perspective view seen in the direction of the arrow XVI of an integrated monolithic silicon component used in the device of FIG. 15.

DETAILED DESCRIPTION OF THE PREFERRED EMBODIMENTS

Figure 1:
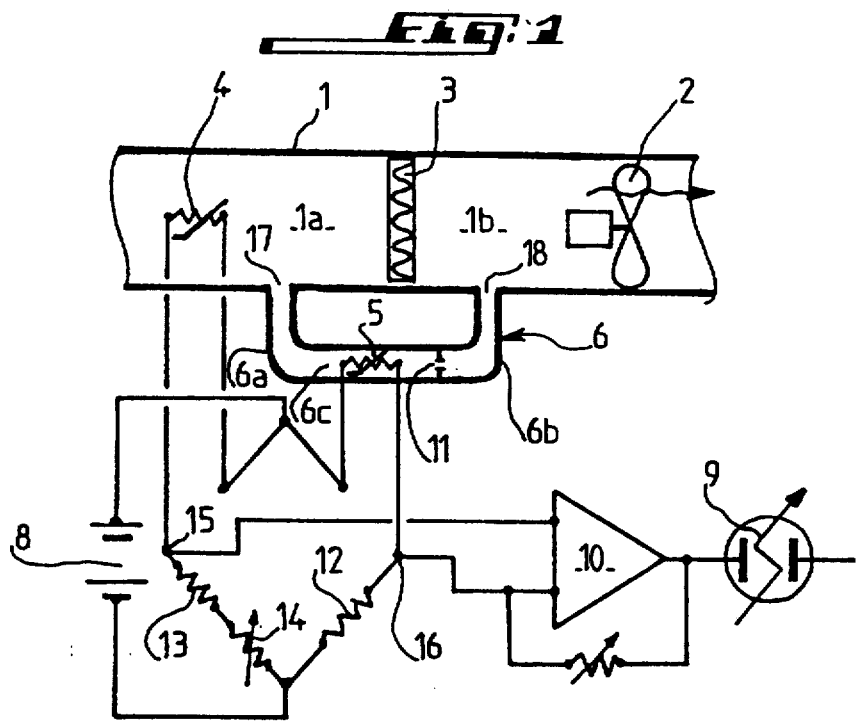
FIG. 1 shows one embodiment of the device according to the invention allowing to detect the clogging of an air filter.

The device of the invention will be described with reference to FIG. 1 on which may be seen as diagrammatically shown an air conditioning equipment comprising an air duct 1 connected to the suction side of a fan 2, this air duct being provided with a filter 3 arranged between the upstream and downstream sections 1a and 1b of the air duct 1.

On this figure may be seen a variable electric resistor 4 placed within the section 1a of the air duct 1 at a location subjecting it to the air flux flowing through the filter and a second variable electric resistor 5 placed within an auxiliary duct 6 connected upstream and downstream of the air filter 3 by duct portions 6a and 6b opening into the duct 1.

This figure diagrammatically shows the electric feeding of both variable resistors according to a so-called "bridge" feed connection from a source 8 and also an indicator member 9 connected to the device through an amplifier 10.

For the sake of simplicity the auxiliary by-pass duct 6 may be of such a size that the flow velocity of the air within the section of location of the electric resistor 5 be nearly equal to the flow velocity of the air within the section 1b of the main air duct when the filter is in the initial cleanliness condition. If need be in order to provide this equality without resorting to a tricky dimensioning of the ducts, a calibrated aperture 11 may be placed within the auxiliary duct 6. The calibrated opening 11 may be replaced by an adjustable nozzle allowing to adjust the flow rate to the desired value.

Preferably and without this condition being a requirement the variable electrical resistors 4, 5 may be selected with ohmic values close to or identical with each other.

The device for the measurement of the state of clogging of the air filter 3 used on the air conditioning equipment operating with a variable air flow rate has an operation based upon the comparative processing of two data expressed as relative values and of physical magnitudes of the same nature owing to a thermal balance device constituted by the bridge connection with resistors.

For that purpose the duct of small cross-section 6 connects the portions of the duct 1 upstream and downstream of the filter 3 and forms a by-pass for the latter.

In operation a fluid flow rate the magnitude of which is dependent upon the head loss of the filter 3 is built up in this duct under the effect of the head difference due to said head loss.

The thermal balance constituting the means for the detection of the clogging of the filter is a device for performing the comparison between one data representative of the velocity of the fluid flowing through the filter 3 and a data representative of the flow velocity of the fluid within the by-pass duct 6 provided between the upstream and downstream sides of the filter 3.

The first one of these data representative of the air speed flowing through the filter 3 is provided by the variation in resistance of an electrical conductor placed in the air flux flowing through this filter. This resistance variation is induced under the influence of the air velocity providing the thermal dissipation of the electrical energy which is applied thereto and thus modifying the temperature of stabilization of the said resistance.

The second data is also provided by the variation in resistance of a second electrical conductor arranged within the auxiliary air duct by-passing the filter 3.

According to a known principle the data relative to the ohmic values of both resistors are obtained by subjecting the latter to the passage of an electrical current. The passage of this current induces a heating of the said resistors. This heating is the less high as these resistors are more strongly cooled by a quick flow of the fluid.

It is known that the characteristics of electrical resistivities of some conducting materials are varying as a function of their temperatures. Thus the measurement of the ohmic values of resistors through which is flowing an electrical current gives an information about the strength of the air flow which is flowing around them. With most materials the electrical resistivity increases with the temperature and for some others the resistivity is decreasing with the temperature, the latter being referred to as having a negative coefficient.

Frequently the materials with a positive temperature coefficient used in these applications are platinum alloys and the materials with a negative temperature coefficient are known under the name of thermistors. Without departing from the scope of the present invention either one of these groups of materials may be used.

The bridge connection used as the comparator means is capable of providing an electrical data upon the state of equilibrium of the ohmic values of both variable resistors.

The whole thus formed consisting of a bridge of resistors, two of which have stationary ohmic values and two of which have variable ohmic values and which are electrically fed and of an amplifying means if necessary allows to detect the imbalance, forms a thermal balance capable of being used for the detection of the relative variation of the velocities of fluids flowing within both ducts 1 and 6.

The electrical information issued from this comparison may be conveyed directly towards the indicator member 9 or through the amplifying means 10.

Figures 2, 3:
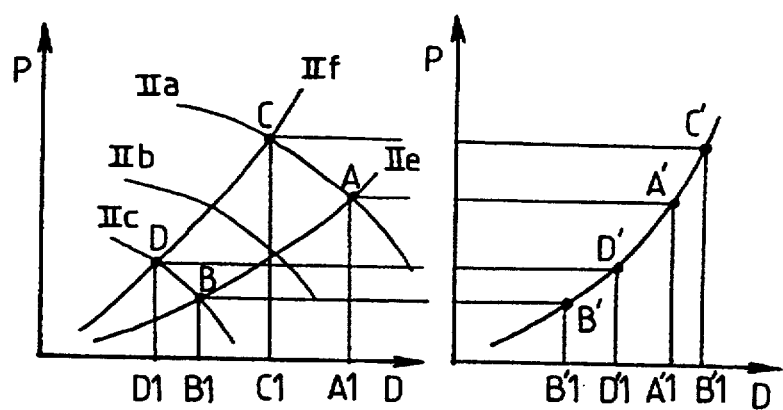
FIG. 2 shows a curve illustrating the evolution of the heads in an air conditioning equipment in accordance with the flow rates and the head loss of the air filter associated with this equipment.
FIG. 3 shows a curve illustrating the evolution of the heads in accordance with the air flow rates resulting within the auxiliary by-pass duct from the head loss of the filter.

To more accurately understand the operation of the invention it is useful to refer to FIG. 2 which depicts the evolution of the heads within the air conditioning treatment of FIG. 1 in accordance with the flow rate and head loss conditions of the air filter 3 which is associated thereto.

On this figure wherein the air flows have been plotted in abscissae and the heads have been plotted in ordinates is seen the curve of the flow rates generated by a fan driven at different speeds (curves IIa to IIc) as well as the curve IIe showing the head loss of the air filter 3, the latter being assumed to be in the initial state, i.e. clean.

The point of intersection A of the curve illustrating the performances of the fan revolving at the speed IIa with the curve illustrating the head losses of the air conditioning equipment IIe indicates the air flow rate and the head supplied by the fan for these conditions of use.

Likewise the point B would illustrate the flow rate and head conditions for the rotational speed IIc of the fan.

When after some time of working the air filter 3 has become gradually loaded with dust it is adapted to catch, these head losses are increasing and the characteristics curve IIe is gradually shifted to become located at IIf considered as a maximum limit of acceptable clogging.

It is then seen that concurrently with the increase of the head loss of the filter 3, the operating points A and B always located at the intersection between the curve characterizing the operation of the fan and the curve illustrating the head loss of the equipment are shifted to C and D, respectively.

The curve of FIG. 3 shows with the same head scale but with another flow rate scale the air flow resulting from the head loss of the filter 3 within the auxiliary by-pass duct 6.

On FIG. 2 there is seen that the clogging of the filter (changing from point A to point C) causes a reduction of the flow rate (changing of the representative point A1 to the point C1) hence of the air velocity when flowing through the filter 3 and on FIG. 3 is seen that an increase in the head between the faces of this filter on the contrary induces an increase of the flow rate (from A'1 to C'1) hence a speed increase within the by-pass duct 6.

This ascertained fact would be the same irrespective of the rotational speed of the fan or the flow rate adjustment of the equipment.

It is thus understood that the thermal balance supposed to detect the flow speeds within the main air duct 1 and within the by-pass duct 6, in equilibrium when the filter is in its new state will become unbalanced as soon as the head loss of this filter will tend to increase more especially as one of the speeds will tend to decrease when the other one will but increase.

On the same figures one may further see that taken separately the flow rate loss phenomena in the main duct 1 and the flow rate gain phenomena in the by-pass duct 6 are very dependent upon the working conditions of the equipment: the flow rate loss from A1 to C1 is very much greater than the flow rate loss from B1 to D1 as well as with the concurrent flow rate increase from A'1 to C'1 in comparison with from B'1 to D'1. One may however see that the sum in absolute value of these flow rate variations exhibited by the bridge connection of the thermal balance is nearly constant and makes the connection relatively insensitive to the conditions of use of the air conditioning system.

Referring again to FIG. 1 one may see that in a first time in the absence of any air movement the whole being put under voltage, if the resistors 4 and 5 have not very different ohmic values and the resistors 12, 13 and 14 connected in series are assumed to be equal, the current in both legs of the bridge will be built up with substantially equal magnitudes.

The action upon the variable resistor 14 allows to adjust the values of the resistors 13 and 14 connected in series to such a value that at the points 15 and 16 of the bridge the voltage be equal. With ohmic values close to equality and when they are subjected to a same current strength, the resistors 4 and 5 undergo an equal heating. Under the action of this heating the ohmic values of these resistors will be modified in the same manner and therefore the amplified output signal will be zero.

The whole being put in operation, the air flow rate being established through the filter 3 assumed to be clean or to be very slightly clogged, the electrical resistor 4 will be cooled in proportional relation to the speed of the air which is flowing therethrough. Under this effect the ohmic value of this resistor 4 will be modified with respect to its initial value.

In a concurrent manner is built up between both faces of the filter a head difference which derives both from the air velocity and from the clogged condition of the filter as one may see it on the diagram of FIG. 2.

Under the influence of this head difference applied to both ends of the duct 6, there is established in the chamber 6c thereof an air flow rate the speed of which, set by the value of the diameter of the calibrated opening 11 is by construction identical with that of the air flowing through in the section of the filter 3.

The electrical resistor 5 subjected to the same current strength as that which is flowing through the resistor 4 undergoes a similar heating compensated for by an identical cooling due to the air speed within the chamber 6c. Therefore the ohmic value of this resistor 5 will be modified in the same manner as that of the resistor 4.

Under these conditions the output signal will still remain zero.

This situation will be maintained whatever the flow rate generated by the fan 2 may be as long as the filter 3 will not be clogged.

As long as this situation will last the potential difference at the terminals 15 and 16 of the bridge will be zero or so small that no signal will be produced by the amplifier 10.

As soon as under the effect of the accumulation of particles the head loss of the filter 3 will tend to rise for a same air flow rate generating a given air velocity in the vicinity of the resistor 4, the head difference at the opening ends 17 and 18 of the duct 6 will rise.

This pressure difference will generate in the chamber 6c in the vicinity of the electrical resistor 5 an air flow rate higher than that created in the vicinity of the resistor 4. It will follow therefrom a stronger cooling of this resistor and therefore a different thermal state of equilibrium giving that variable resistor an ohmic value different from that of the resistor 4.

Under the effect of this ohmic value difference, the measuring bridge will be unbalanced and a small potential difference will appear at the terminals 15 and 16 of the bridge. When applied to the input of the amplifier 10, this potential difference will provide a workable signal of alarm or indicatory of the state of clogging of the filter 3.

For the sake of easier understanding the operation of the whole system has been set forth while assuming like original ohmic values of the variable resistors but without departing from the scope of the invention, these resistors may be different and that difference may be compensated for by matched electronics. Likewise it has been assumed that like air speeds have been provided in the absence of clogging at the output of the filter 3 and within the by-pass chamber 6. These velocities however may be different, however little these differences be compensated for by suitable values of the resistors or by matched electronics.

The embodiment described hereinabove is of course one example only and it could be modified in particular through substitution of technical equivalents without therefor departing from the scope of the invention. In particular the measurement of the ohmic values of the variable resistors may be carried out by any other known means and/or the comparison of these values only performed after amplification of the voltage signal.

FIG. 4 shows an alternative embodiment of the bridge connection with resistors wherein the variable resistor 4 subjected to the air flux flowing through the filter 3 is placed downstream thereof without this arrangement leaving the scope of the invention.

FIG. 5 shows another alternative embodiment of the arrangement which is more particularly adaptable to the cases where the air filter 3 is placed forward of any treatment manner in the direction of flow. In this case the head prevailing upstream of the filter 3 is very close to the atmospheric head or differs therefrom only by a value which only depends upon the flow rate of the treated air. The auxiliary air duct 6 may then advantageously be reduced to a simple external air intake duct.

In the embodiments proposed hereinabove the variable resistors of the measuring bridge are performing a double function: providing the heating and allowing the measurement of the stabilization temperature of the whole. These two functions could of course be fulfilled by separate members as shown on FIG. 6. On this figure are shown two fixed heating resistors 19 and 20 electrically fed from the source 8 and in thermal connection with the variable resistors 4 and 5. Without leaving the scope of the present invention and by extension of this last arrangement and according to a known principle of measurement of the flow velocity, the resistors providing the heating and those providing the measurement may be separated.

FIGS. 8 to 16 show various embodiments improving those previously described.

FIGS. 8 to 12 show the detection device according to the invention assembled to an air filter 21 of the kind with folds or pleats mounted in a main duct such as the main duct 1 of FIG. 7 of an air treatement equipment operating with a constant or variable flow rate and consisting for example of a heating and/or air conditioning equipment of an automotive vehicle.

The detection device comprises a main supporting body 22 consisting of a case shaped front portion 23 the bottom forming wall 24 of which comprises two aligned circular thoroughfare openings 25 and 26 and two rear elements 27, 28 connected underneath the wall 24 while clearly projecting therefrom. Both rear elements 27, 28 are identical and each one bevelled and conforming to the hollow of a fold or pleat of the air filter 21 defined by the side faces 21a and 21b of the fold or pleat. Each rear element 27, 28 is extended by a stud 29, 30 extending through the connecting edge of the fold while projecting therefrom. The front portion 23 is resting upon the downstream face of the air filter 21 by the wall 24 bearing upon two adjacent edges of the two folds or pleats located on either side of the fold containing the rear elements 27, 28 and comprises two side walls 31, 32 projecting below the wall 24 over some distance while bearing upon both opposite external faces, respectively, of both neighbouring folds. The body 22 is thus held in position in relation to the air filter 21 by both side walls 31, 32 and is fastened to this filter by two split resilient washers 33, 34 fastened through clamping onto the studs 29 and 30, respectively, abutting against the connecting edge of the lateral faces 21a, 21b of the fold containing the rear elements 27 and 28. Preferably the front portion 23, the rear elements 27, 28 and the studs 29, 30 of the body 22 are made in one single piece.

In the position of assembly of the supporting body 22 to the air filter 21, the rear elements 27 and 28 are defining therebetween an isolated portion 21c of the air filter 21 through which is flowing the air flowing through the hole 25 from bottom to top when considering FIG. 8.

The stud 30 associated with the rear element 28 comprises a cylindrical axial bore 31a opening into the aperture 26 to which it is connected through the agency of a frusto-conical bore 28a formed in the rear element 28 and having an angle at the vertex of about 7°. The free end of the stud 30 connects to the bore 30a through the medium of a fillet 30b. The fillet 30b, the bore 30a, the frusto-conical bore 28a diverging upwards with respect to FIG. 9 and the opening 26 form an auxiliary duct shaped as a Venturi nozzle 35 extending in the main duct in parallel relation to the longitudinal center line axis thereof and opening upstream and downstream of the air filter 21. Thus air may flow through the auxiliary duct 35 forming a by-pass duct without flowing through the filtering material of the air filter 21. The isolated portion 21c of the filter 21 is adjacent to hence near the auxiliary duct 35.

A plate 36 is removably accommodated within the box-shaped front portion 23 of the body 22 and enclosed within the portion 23 by a cover 37 fastened to the front portion 23. The plate 36 comprises two thoroughfare apertures 38 and 39 with diameters and spacing equal to the diameters and spacing, respectively, of the holes 25 and 26 of the wall 24. In the assembled position of the plate 36 within the portion 23, the openings 38 and 39 are coaxial with the openings 25 and 26, respectively, and provide for the flow of air through the filtering portion 21c and the auxiliary duct 35. The cover 37 also comprises two cylindrical apertures 40 and 41 with diameters and spacing identical with the diameters and spacing of the openings 38 and 39 of the plate 36. In the position of the cover 37 assembled to the portion 23, the apertures 40 and 41 are coaxially juxtaposed with the openings 38 and 39, respectively, so as to allow the air flow through the filtering portion 21c and the auxiliary duct 35. As shown the openings 40 and 41 are connecting to the top face of the cover 37 by fillets 40a and 41a.

The plate 36 is made from an electrically insulating material carrying conductive tracks 42 arranging the plate 36 into a printed circuit and to the ends of which are electrically connected two sensing means 43 and 44 mounted onto the plate 36 so as to be located at the centers of the openings 38 and 39, respectively, substantially in a same plane so as to lie in front of both openings 25 and 26, respectively, of the wall 24. Thus the sensing means 43 is steeped within the air flux flowing through the filtering portion 21c and the apertures 25, 38 and 40 arranged in series whereas the sensing means 44 is steeped within the air flux flowing through the auxiliary duct 35 and the openings 26, 39 and 41 arranged in series. The plate 36 also comprises terminals 45 for the connection of the outputs of the sensing means 43 and 44 to an electronic circuit 46 for the processing of the signals from the sensing means, identical with that shown on FIG. 1 and mounted on a printed circuit plate. The electronic circuit 46 is shown as being connected to the terminals 45 by electrical lead wires but a binding connector is actually provided between the plate 36 and the electronic circuit 46 mounted on the printed circuit plate. According to an alternative embodiment the electronic processing circuit 46 is set upon the plate forming a printed circuit 36.

The sensing means 43 and 44 are identical with the sensing means 4 and 5 and mounted in the same fashion as the latter into a measuring bridge connection with resistors. Thus the sensing means 43 provides an electrical signal representative of the air speed flowing through the filtering portion 21c of the air filter 21 whereas the sensing means 44 provides an electrical signal representative of the air speed flowing through the auxiliary duct 35. Preferably each sensing means 43, 44 consists of an electrical conductor the resistance of which varies under the influence of the velocity of the air in which it is steeping and providing the thermal dissipation of the electrical energy which is applied thereto and changing the stabilization temperature of the resistance of this conductor. Each sensing means 43, 44 may be made from a material having a positive temperature coefficient and the resistivity of which thus increases with the temperature or from a material with a negative temperature coefficient or thermistor the resistivity of which decreases with the temperature.

The operation of the detection device according to the invention already appears in part from the description thereof which has been made hereinabove and will now be explained.

It should at first be pointed out that the air flowing through the filtering portion 21c defined between both rear elements 27 and 28 is a quite representative sample of the air flowing through the whole air filter 21.

Under the influence of the head loss opposed to the air flow by the filter 21, the head difference prevailing between both ends of the auxiliary Venturi duct 35 would generate a flow rate in which is steeping the sensing means 44 without having to go beyond the air filter 21. It should be pointed out that the head losses of the straight auxiliary duct 35 essentially are friction losses and that these losses are independent of the state of clogging of the air filter 21. It is also important to point out that the thin air streams flowing through the auxiliary duct 35 and the thin air streams flowing through the filtering portion 21c of the filter 21 are of very neighbouring origins in the general flow and no temperature gradient exists between these thin air streams since they are very close to each other. Therefore the conditions of thermal dissipation of both sensing means 43 and 44 located near each other will only depend upon the air flow rates or velocities flowing through the portion 21c of the filter 21 and the auxiliary duct 35, respectively.

When the air is caused to flow for example under the action of the fan 2 in the main duct 1 and when the air filter 21 is clean or not very much clogged the air would flow rather freely through the filter 21 generating a moderated head loss within the latter and providing a head difference between the faces of this filter. This head loss would generate a moderate air flow within the auxiliary duct 35. The air flow rate through the duct 35 and about the sensing means 44 would impart thereto a temperature of thermal balance resulting from the combined action of the passage of the electrical current into the sensing means 44 as supplied by the measuring bridge and from the air flow velocity. Comparatively the air flowing through the filtering portion 21c of the filter 21 with a velocity comparable with that of the air passing through the filter itself would stronger cool the sensing means 43 which will get an equilibrium temperature lower than that of the sensing means 44. In this case the measuring bridge provides to the amplifier 10 a signal intended to activate or energize the indicator means 9 signalling the clean condition of the air filter 21.

When the filter is gradually becoming clogged under the effect of the retention of particles in suspension in the treated air, the head loss generated by the filter 21 will tend to increase by concurrently raising the head difference between the ends of the auxiliary Venturi duct 35 hence the air flow velocity in this duct. The stabilization temperature of the sensing means 44 would gradually lower so that the ohmic value of the conductive element of this sensing means would become equal to the ohmic value of the conductive element of the sensing means 43 thereby bringing then the measuring bridge of the circuit 46 to its point of balance at the limit of providing a signal representative of the clogging of the filter. If the clogging of the filter 21 is keeping developing the head loss generated by the filter 21 would also increase thereby further increasing the head difference between the ends of the auxiliary Venturi duct 35 hence the flow velocity of the air within which is steeping the sensing means 44 the ohmic value of which is then changed to produce a clear imbalance of the measuring bridge which provides to the amplifier 10 an electrical voltage representative of the clogging of the filter.

FIG. 13 shows the same device as that of FIG. 8 but arranged in a flat air filter 21.

FIG. 14 shows an alternative embodiment of the device of FIG. 8 according to which there is provided an approximately semi-spherical cap C arranged in the vicinity of the end of the stud 30 of the Venturi duct 35 without closing the latter. The cap C performs the function of creating an air flow in baffle-like configuration at the inlet of the Venturi duct 35 acting as an inertial separator for preventing the dusts of great diameter from clogging the throat of small diameter of the Venturi duct 35.

FIGS. 15 and 16 show an alternative embodiment of the device of FIG. 8, according to which the supporting plate 36, both sensing means 43, 44 and the electronic circuit 46 form an integrated monolithic silicon component 37 housed within the front portion 23 of the body 22. As shown the sensing means 43 and 44 are disposed transversally of two windows 38 and 39, respectively, which correspond to the openings 38 and 39 of FIG. 8. These figures also show that the contact terminals 45 are connected to electric lead wires 48 electrically connected to strips 49 extending into corresponding female portions of an electrical connector 50 connected to the means 9 indicatory of the clogging of the filter 21 or to a device for the automatic unclogging of this filter.

What is claimed is:

1. A device for detecting clogging of an air filter located in a main duct of an air treatment apparatus operating with a constant or variable air flow, comprising an auxiliary air duct opening upstream and downstream of the air filter so as to generate in the auxiliary duct an air flow due to the head loss of the air filter, the air flow through the auxiliary duct having a velocity relative to the head loss, the auxiliary duct extending through the air filter such that the air flow through the auxiliary duct does not flow through the air filter;

means for positioning the auxiliary duct within and in the same axial direction as the main duct;

first sensing means arranged entirely within the main duct in proximity to the air filter for providing a signal relative to the flow velocity of the air flowing through the air filter;

second sensing means arranged within the auxiliary duct in proximity to the first sensing means for providing a signal relative to the air flow velocity in the auxiliary duct; and an electronic circuit for receiving the signals from the first and second sensing means and generating a signal representative of a limit clogging of the air filter when the air flow speeds in the main duct and the auxiliary duct are differing by a determined value corresponding to a limit head loss of the air filter.

2. A device according to claim 1, wherein the auxiliary duct is a tube shaped as a Venturi nozzle.

3. A device according to claim 1, further comprising a body for supporting the auxiliary duct, made fast to the air filter and defining within the latter an insulated portion of the air filter adjacent to the auxiliary duct whereas the first sensing means is located within the air flow flowing through the insulated portion of the air filter.

4. A device according to claim 3, wherein the supporting body comprises a front portion having a bottom wall and two identical parallel rear elements connected to said bottom wall of said front portion and extending through the air filter while being separated from each other so as to define the insulated portion of the air filter.

5. A device according to claim 4, wherein the auxiliary duct is defined within one of the rear elements and by a stud extending this rear element while projecting from the air filter.

6. A device according to claim 5, wherein the rear element is extended by a stud projecting from the air filter whereas the front portion of the supporting body is held in bearing relationship upon the corresponding face of the air filter by two holding members fastened to both studs, respectively, while abutting against the opposite face of the air filter, each of said holding members comprising a split resilient washer.

7. A device according to claim 5, wherein the air filter has folds, both rear elements of the supporting body conforming to the hollow of one of said folds of the air filter and both studs extending through the connecting edge of said one of said folds.

8. A device according to claim 7, wherein the front portion, the rear elements and the studs of the supporting body are made in one single piece.

9. A device for detecting clogging of an air filter located in a main duct of an air treatment apparatus having a constant or variable air flow, comprising an auxiliary air duct opening upstream and downstream of the air filter so as to generate in the auxiliary duct an air flow due to the head loss of the air filter, the air flow through the auxiliary duct having a velocity relative to the head loss;

first sensing means arranged entirely within the main duct in proximity to the air filter for providing a signal relative to the flow velocity of the air flowing through the air filter, the first sensing means comprising an electrically conducting element positioned in the flow of air through the air filter;

second sensing means for providing a signal relative to the air flow velocity in the auxiliary duct, the second sensing means comprising an electrically conducting element positioned in the flow of air through the auxiliary duct; and an electronic circuit for receiving the signals from the first and second sensing means and generating a signal representative of a limit clogging of the air filter when the air flow speeds in the main duct and the auxiliary duct differ by a predetermined value corresponding to a limit head loss of the air filter, wherein the conducting elements of the first and second sensing means are provided with a resistance having a positive or negative temperature coefficient, the electronic circuit generating the signal representative of the limit clogging of the air filter when the ratio of the values of the resistances of the conducting elements of the first and second sensing means corresponds to the limit head loss of the air filter.

10. A device according to claim 9, wherein said auxiliary duct is elongate and has one end connected to the main duct and opening downstream of the air filter.

11. A device according to claim 9, wherein said auxiliary duct is branched off the main duct in a by-passing relationship whereby air flow through said auxiliary duct by-passes said main duct.

12. A device according to claim 9, wherein said auxiliary duct is elongate having first and second opposed ends, said first end of said auxiliary duct opening into said main duct downstream of said air filter and said second end of said auxiliary duct communicating with the atmosphere whereby the head prevailing in said main duct upstream of said air filter substantially corresponds to atmospheric head.

13. A device according to claim 9, wherein the auxiliary duct has such a size that the air flow velocity therein in the vicinity of the second sensing means is substantially equal to the speed of the air flowing through the air filter when the air filter is clean.

14. A device according to claim 13, further comprising a calibrated aperture with an adjustable cross-section placed within the auxiliary duct for making substantially equal the air flow velocities in the main and auxiliary ducts.

15. A device according to claim 9, wherein each electrically conductive element with a variable resistance is directly heated by the current flowing there through or is heated by an auxiliary electrical resistor located close thereto.

16. A device according to claim 9, wherein the electronic circuit comprises a measuring bridge connection with resistors, two adjacent legs of which comprise both conducting elements with variable resistances, respectively, and delivering a determined voltage of imbalance of the bridge when the ratio of the values of the resistances of the conducting elements corresponds to the limit head loss of the air filter; and an amplifier connected at the output of the measuring bridge connection with resistors to amplify the output voltage of the measuring bridge connection and to thus provide the signal representative of the limit clogging of the air filter to a clogging indicating means or to a device for the automatic unclogging of the air filter.

17. A device according to claim 16, wherein the amplifier is connected to a clogging indicating means or to a device for the automatic unclogging of the air filter.

18. A device for detecting clogging of an air filter located in a main duct of an air treatment equipment operating with a constant or variable air flow, comprising an auxiliary air duct opening upstream and downstream of the air filter so as to generate in the auxiliary duct an air flow due to the head loss of the air filter, the air flow in the auxiliary duct having a velocity varying relative to the head loss, the auxiliary duct extending through the air filter such that the air flow through the auxiliary duct does not flow through the air filter;

support means for supporting the auxiliary duct within and in the same axial direction as the main duct, said support means being connected to the air filter and defining an insulated portion in the air filter adjacent to the auxiliary duct; said support means comprising a supporting body having a box-shaped front portion located external to the air filter and bearing upon the downstream face of the air filter, said front portion comprising a bottom wall having first and second apertures, the air flow through the insulated portion of the air filter passing through the first aperture and the air flow through the auxiliary duct passing through the second aperture;

first sensing means arranged in proximity to the air filter in alignment with the first aperture, the first sensing means providing a signal relative to the flow velocity of the air flowing through the air filter;

second sensing means arranged within the auxiliary duct in proximity to the first sensing means in alignment with the second aperture, said second sensing means providing a signal relative to the air flow velocity in the auxiliary duct;

said support means further comprising a supporting plate removably housed within the front portion of the supporting body, the first and second sensing means being located substantially in the same plane in proximity to the bottom wall and being mounted on the supporting plate, said support means further comprising a cover fastened to the supporting body for enclosing the supporting plate in the front portion, said supporting plate and said cover comprising apertures aligning with the first and second apertures of the bottom wall so as to allow passage of air through the auxiliary duct of the insulated portion of the air filter; and an electronic circuit for receiving the signals from the first and second sensing means and generating a signal representative of a limit clogging of the air filter when the air flow speeds in the main duct and the auxiliary duct are differing by a determined value corresponding to a limit head loss of the air filter.

19. A device according to claim 18, wherein the supporting plate comprises a printed circuit, the first and second sensing means and the electronic circuit for processing the signals originating from the first and second sensing means being set on said printed circuit.

20. A device according to claim 18, wherein the supporting plate, the first and second sensing means and the electronic circuit for processing the signals from these sensing means form an integrated monolithic silicon component.

* * * * *